United States Patent [19]
Fontenot et al.

[11] Patent Number: 5,774,816
[45] Date of Patent: Jun. 30, 1998

[54] APPARATUS AND METHOD FOR CLEANING A VESSEL

[76] Inventors: Chris W. Fontenot, 110 Indian Mound Rd., Lafayette, La. 70501; Karl K. Burdette, 1011 Bonnie Dr., Lafayette, La. 70503

[21] Appl. No.: 648,415

[22] Filed: May 15, 1996

[51] Int. Cl.[6] ....................................................... G21F 9/00
[52] U.S. Cl. ............................. 588/1; 134/22.1; 210/295; 210/296; 210/320; 210/770; 210/772; 166/311; 137/544; 137/545; 137/546; 976/DIG. 376; 588/20
[58] Field of Search .................................... 210/768, 770, 210/772, 295, 296, 320; 134/22.1; 588/1, 20; 976/DIG. 376; 166/311; 137/544, 545, 546

[56] References Cited

U.S. PATENT DOCUMENTS

| | | | |
|---|---|---|---|
| 2,903,015 | 9/1959 | Erwin | 137/546 |
| 3,672,512 | 6/1972 | Werner | 210/523 |
| 4,024,881 | 5/1977 | Weiland | 134/104 |
| 4,206,001 | 6/1980 | Knowlton | 134/12 |
| 4,783,272 | 11/1988 | Patterson | 210/787 |
| 4,913,819 | 4/1990 | Patterson | 210/523 |
| 4,948,393 | 8/1990 | Hodson . | |
| 5,075,044 | 12/1991 | Augem | 252/631 |
| 5,076,936 | 12/1991 | Metz | 210/662 |
| 5,232,475 | 8/1993 | Jepson | 55/36 |
| 5,236,605 | 8/1993 | Warncke | 210/799 |
| 5,271,851 | 12/1993 | Nelson et al. . | |
| 5,415,776 | 5/1995 | Homan | 210/519 |

Primary Examiner—Ngoclan Mai
Attorney, Agent, or Firm—Dominque, Delaune&Waddell

[57] ABSTRACT

An apparatus for cleaning a separator is disclosed. Generally, the apparatus includes a vessel connected to a well that produces an effluent. The vessel is used for separating the effluent. Also included is a discharge member which is attached within the vessel for discharging a liquid onto solids located at the bottom of the vessel, and a drain adapted for draining the solids from the bottom of the vessel. The apparatus may further include a chemical injection device, operatively associated with the discharge member, for injecting a radioactive dissolution chemical. A process for cleaning the vessel and treating the entrained solids of the effluent with the radioactive dissolution chemical is also described.

15 Claims, 4 Drawing Sheets

APPARATUS AND METHOD FOR CLEANING A VESSEL

BACKGROUND OF THE INVENTION

This invention relates to vessels. More particularly, but not by way of limitation, this invention relates to a novel apparatus and method to clean and treat vessels used for the separation of a produced effluent from a well.

In the production of hydrocarbons from oil and gas well bores, the effluent emanating from the subterranean reservoir will contain a mixture of fluids, gases and solids. The fluids will include liquid hydrocarbons as well as formation water. The gas will consist mainly of a methane (CH4) composition. The liquid hydrocarbons will contain primarily an alkane from C2 to C20. The solids within the effluent may be grains of formation sands and clays that become dislodged during the down hole production process.

At the surface, facilities are constructed to handle, separate, and thereafter transport the hydrocarbons. The facilities to handle and separate may be referred to as production facilities. The production facilities include separators, flow manifolds, heater treaters, glycol units, and so on as is well understood by those of ordinary skill in the art. The separators may be two-phase or three-phase separators.

The effluent may contain radioactive material that is entrained within the formation waters, hydrocarbons and/or formation reservoir sand/clays. For instance, two series of naturally occurring radioactive isotopes that occur in significant quantities in sedimentary rocks are uranium and thorium series. Other significant naturally occurring radioisotope is that of potassium. Further, radium may be found in reservoir gas and fluids. Many times, during the drilling process radium may attach to the drilling fluid particles being circulated within the well bore.

During the process of separating the fluids and/or gas, solids entrained within the effluent will drop out of solution. When operating, the vessel has a constant level and flow of effluent there through with constituents previously mentioned. Separation occurs as the effluent flows through the vessel process allowing sand/solids to settle to the bottom. The sand/solids accumulate and compact along the bottom of the separator. Depending on the well production, a significant amount of sand/solids may accumulate in a very short period of time. As the level of sand/solids increase, the vessel fails to operate to its capacity and production is reduced. At this point, the vessel is usually shut-in for manual cleaning i.e. sand/solids removal. This entails the removal of accessible manways or inlets to flush or vacuum the accumulation of sand/solids. This may also require human entry into the vessel for cleaning.

Numerous prior art devices have proposed devices that attempt to clean the vessel. For instance, in U.S. Pat. No. 4,913,819, to Patterson, a liquid jet solids removal system for process vessels is disclosed. The system includes a liquid jet manifold with the manifold having an array of jet nozzles. In U.S. Pat. No. 4,783,272 to Patterson, the inventor discloses a system for separating solids from a liquid flow stream that includes a manifold and pump connected to cyclone separators.

Despite these and other devices, the prior art suffers from several deficiencies. The prior art devices do not allow for installation into existing separators devices which will clean the vessel. The prior art devices do not provide for efficient cleaning of the separator, thus, the well must be periodically shut-in so that the separator may be cleaned out. Further, the prior art devices do not treat the fluids, gas and/or solids for radioactive materials. These and other problems are solved by the invention herein disclosed as will be more fully described.

SUMMARY OF THE INVENTION

An apparatus for separating an effluent from a well is disclosed. The effluent will consist of fluids, gas and solids. The apparatus includes a vessel connected to the well with the vessel containing an inlet for the effluent. Also included will be a separating means for separating the effluent into a liquid phase and gas phase. Generally, as the effluent travels through the vessel, the gas phase and liquid phase separate and the solids settle to the bottom of the vessel.

The apparatus further includes a fluid outlet means for releasing the separated fluid phase and a gas outlet means for releasing the separated gas phase; discharge means, attached to the vessel, for discharging a liquid onto the solids at the bottom of the vessel; and, drain means for draining the solids from the bottom of the vessel. The apparatus may further comprise pump means for pumping the cleaning liquid through said discharge means so that the cleaning liquid drives the solids into the drain means.

In one embodiment, the discharge means comprises a line having a first end and a second end, with the first end being attached to the vessel and with the second end being attached to the pump means, with the line having an opening thereon so that the cleaning fluid is sprayed on the solids.

In another embodiment, the apparatus may also include a chemical injection means, operatively associated with the line, for injecting a radioactive dissolution chemical. This embodiment would also include a slurry tank adapted to the drain for mixing and separating the solids and fluid, as well as a second pump used for pumping the chemically treated fluid to a heating unit used for heating the chemically treated fluid. The heating unit is fluidly connected to either the vessel's line or a by-pass line. The by-pass line is adapted for circulating the chemically treated fluid and solids within a closed-loop.

In one embodiment, the line contains an opening oriented in a 90 degree inclination relative to the bottom of the vessel, a second opening with a 45 degree inclination relative to the bottom of the vessel, and a third opening with a 0 degree inclination relative to the bottom of the vessel. Generally, in the preferred embodiment, the openings are oriented at a position above the drain means so as to facilitate the removal of the solids once the drains are opened. Nevertheless, the degree of inclination may be changed according to the vessel configuration.

A method of cleaning a vessel is also disclosed. Generally, the method includes producing the effluent from the well, and thereafter receiving the effluent within the vessel. The effluent is separated into a liquid phase and a gas phase by passage through the vessel as is well known in the art. The solids in solution are segregated so that the solids fall to the bottom of the vessel. A fluid is injected into the vessel via a discharge line so that the segregated solids are fluidized.

The method further includes draining the fluidized solids through the drain means, and terminating the injection of the fluid. The operator may continue to produce the effluent from the well without any stoppage of production. This process may be started again at the discretion of the operator.

In one embodiment, the vessel contains chemical injection means, operatively associated with the discharge means, for injecting a radioactive treating chemical onto the solids. The method further comprises injecting the radioactive treating chemical onto the segregated solids while in the vessel, and draining the fluidized slurry solids through the drain means. Thereafter, the slurry with solids are pumped to a slurry/mixing tank which thoroughly soaks the solids with the dissolution chemical, and also serves to allow the solids to segregate to the bottom of the tank thereby providing separation of the solids from the liquids in the composition. Thereafter, the transported liquid is heated in the heating unit.

A closed loop exists with this embodiment such that the liquid may then be again transported to the mixing tank where any further solids within the composition are separated from the liquid, and thereafter, the liquid is pumped back into the heating unit. The closed loop will direct the heated liquid back into the slurry tank and the process may be continued until the dissolution of the naturally occurring radioactive material (N.O.R.M.) from the solid particles is complete. The mixing tank can be cleared of the solids which have collected in the mixing tank and the liquid can be disposed. One possible method of disposal is transportation to a disposal injection well.

An advantage of the present invention includes not having to curtail production in order to preform the remedial cleaning and maintenance of the vessel since the cleaning process is ongoing. Another advantage includes the apparatus herein described may be installed on existing separators without the need for fabricating new separators which is a costly and time consuming venture. Still yet another advantage is the production from the well is maximized since the flow through efficiency of the separator will be higher.

Another advantage includes the treatment of the effluent with a dissolution chemical that will disassociate radioactive elements associated with the solids into the liquid solution. Thereafter, the liquid may be injected into a disposal well. Still yet another advantage is the elimination of the naturally occurring radioactive material at the separator, rather than allowing the radioactive material to proceed to the other down stream process equipment.

A feature of the present invention includes existing separators may be modified in accordance with the teachings of the present invention. Further, a minimal amount of welding is required to the vessel in order to convert the separator to the novel configuration herein disclosed.

Another feature includes the openings on the discharge line may be varied in number, size, and direction. Jet nozzles may be placed therein to increase discharge velocity. Still yet another feature includes designing the openings in order to meet the specific separator/capacity and/or specific design criteria. For instance, some separators are designed for high volumes, others for primarily liquid-gas separation, while others may be designed for an effluent with a large solids percentage.

Another feature includes the ability to circulate the radioactive dissolution chemical within the vessel in a continuous process. Alternately, the system may be switched over to a closed-loop so that the fluid is circulated longer and more heat is added to the slurry for better dissolution. Still yet another feature is that the process and apparatus is applicable to all vessels which must be periodically cleansed of solids such as heater treaters, glycol units??? etc . . .

DETAILED DESCRIPTION OF THE PREFERRED EMBODIMENTS

Figure 1:
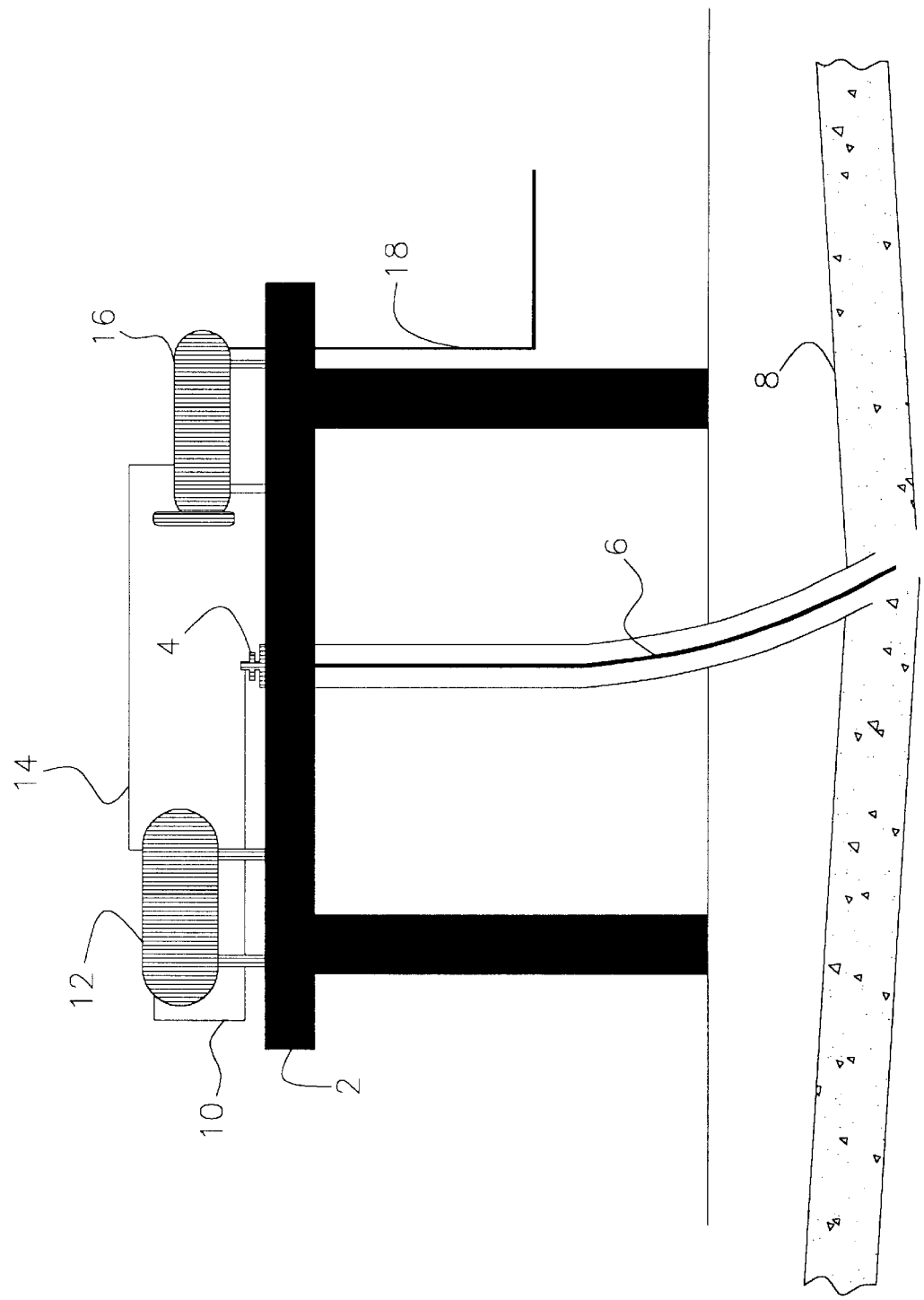
FIG. 1 is an illustrated view of a typical offshore oil and gas platform.

Referring to FIG. 1, a representation of a typical oil and gas platform 2 is illustrated. The platform contains a well head 4 that is connected to a tubing string 6 that serves as a conduit for the production of oil, gas, water and solids (hereinafter referred to as effluent) from the reservoir 8. As is well understood by those of ordinary skill in the art, the effluent is produce to the well head 4 and thereafter is transported via a flow line 10 to process equipment located on the platform 2. The process equipment may include a separator 12 for separating the effluent into its different constituents, namely: oil, gas, water and solids.

The FIG. 1 also depicts an oil outlet line 14 that leads to a heater treater 16, which is also well known in the art. Thereafter, the oil may be pumped into a pipeline 18 for transportation to a shore base. It should be noted that production facilities on land as well as offshore are varied with many different types and configurations. FIG. 1 is met to be illustrative. Further, the teachings of the present invention make the apparatus and system applicable to land based production facilities.

Figure 2:
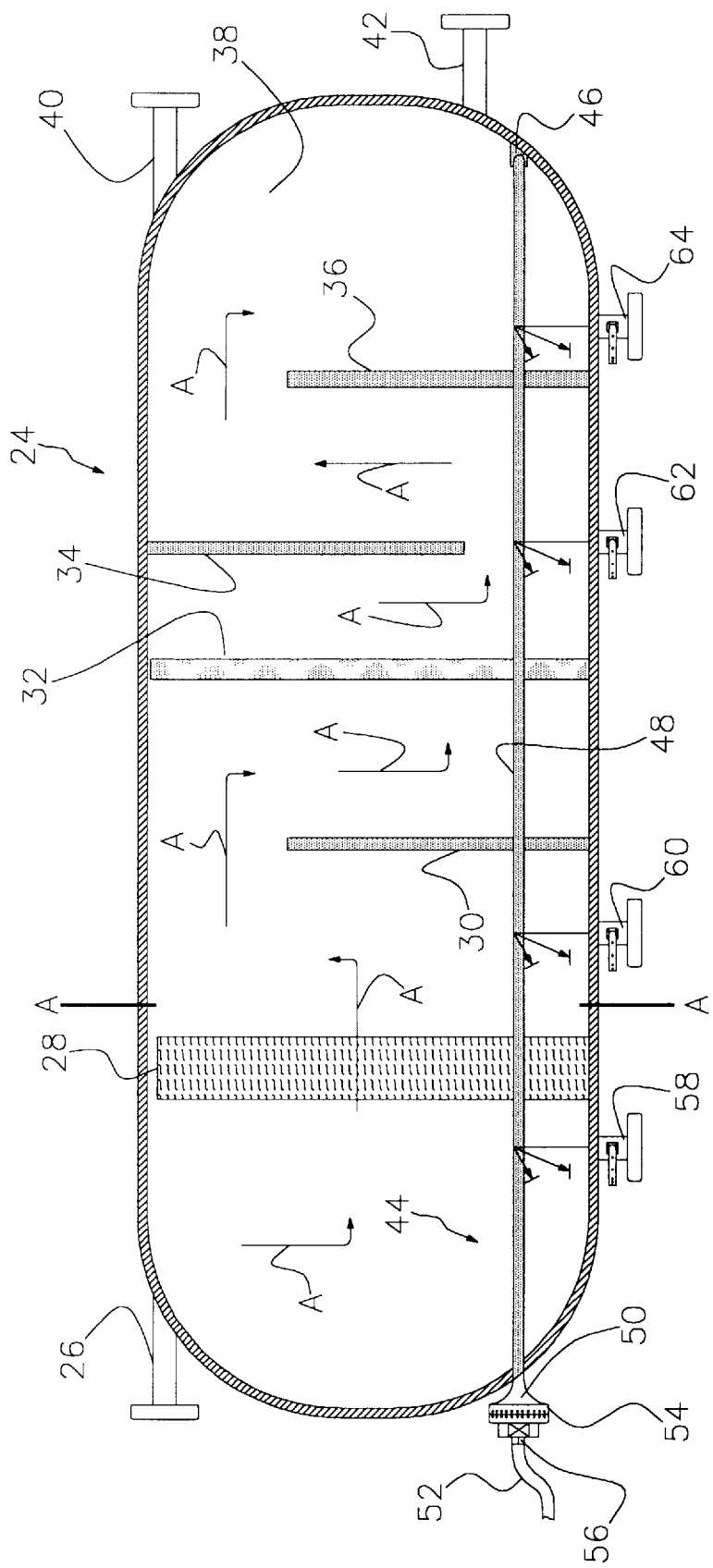
FIG. 2 is a cross-sectional view of a vessel that has been modified with the system of the present invention.

Referring now to FIG. 2, a cross-sectional view of a vessel 24 that has been modified in accordance with the system of the present invention is shown. The vessel 24 depicted in FIG. 2 is generally a two-phase separator which is generally designed for separating a two-phase effluent of gas and water (along with the produced entrained solids).

The vessel 24 contains an inlet 26 where the effluent enters the vessel via the flow line 10. The general flow of the effluent is shown by the flow arrows "A". The flow is induced by a pressure drop through the vessel 24 from the inlet 26 relative to the outlet. Thus, the effluent enters the vessel 24 and travels through the filter pack 28. The filter pack 28 serves to knock out water as well as solids.

The effluent continues to flow through vessel and is further separated by the weir 30. Thereafter, the flow continues into the de-aerator 32 which is designed to further knock out water being carried by the gas. A second weir 34 and a third weir 36 are also included which aid in the working level of fluid within the separator. The weirs 30, 34, and 36 may be adjusted as needed by the specific flow conditions and nature of the effluent as will be understood by those of ordinary skill in the art.

Once the flow reaches the compartment denoted by the numeral 38, the gas portion of the effluent will be allowed to exit via the gas outlet 40. From this point, the gas may be conveyed to a compressor and in turn to a pipeline for transportation to a receiving station. The fluid that has also made its way through the vessel 24 will exit at the fluid outlet 42. Assuming that the fluid is water, some possible means of handling include discharging the water over board, or injecting into a subterranean injection zone.

The embodiment of FIG. 2 further includes a discharge means 44 for discharging a liquid onto the solids which have settled to the bottom of the vessel 24 during the separation process. A method of installing the discharge means 44 may be as follows. A seat or receptacle coupling 46 would be welded to the rear (near the outlet 42) internal wall of the vessel 24 approximately 12" from the bottom to receive the tubing 48. An opening 50 (approximately 2") would be cut in the front portion (same perimeter as the inlet 26) of the vessel 24 and a 2" pipe 52 would be extended outward from the vessel wall. A 4" pipe flange 54 would be welded to the front of the pipe. A 2" male camlock nipple 56 fastened to the 4" pipe flange 54 would be connected to the flange on the pipe. A flange valve (not shown) would be inserted between the two flanges. The 1"–2" stainless steel tubing 48 would fit in the seat at the rear of the vessel, run through the weirs 36,30 and filter pack 28, to the front of the vessel. The tubing 48 would be welded to the internal wall where the opening 50 was cut through the vessel 24.

Approximately 1/8"–1/4" apertures would be drilled through the tubing 48 directly over each drain (namely 58, 60, 62, 64) about twelve inches from the bottom of the vessel. As will be set forth in FIG. 3, the bottom aperture would jet water towards the drain causing a downward flow. The aperture drilled at a 45 degree angle would slurry the sand/solids around the drain. The aperture drilled at a 90 degree angle would loosen any packed sand/solids along the walls of the vessel. The 0 degree phase would funnel those solids above the drain.

A pump, for instance a triplex pump, would be operatively associated with the pipe 52 and would be capable of pumping approximately 200–300 gallons per minute at 300–400 psi and would be connected with hoses to the male camlock nipple 56. The drains 58, 60, 62, 64 would be opened and manifolded to a mixing/storage container. The pump would flush the sand/solids accumulated through the drains while the vessel 24 is operating. The frequency of the flushing would depend on the amount of produced sands from the well or maintenance schedule.

Figure 3:
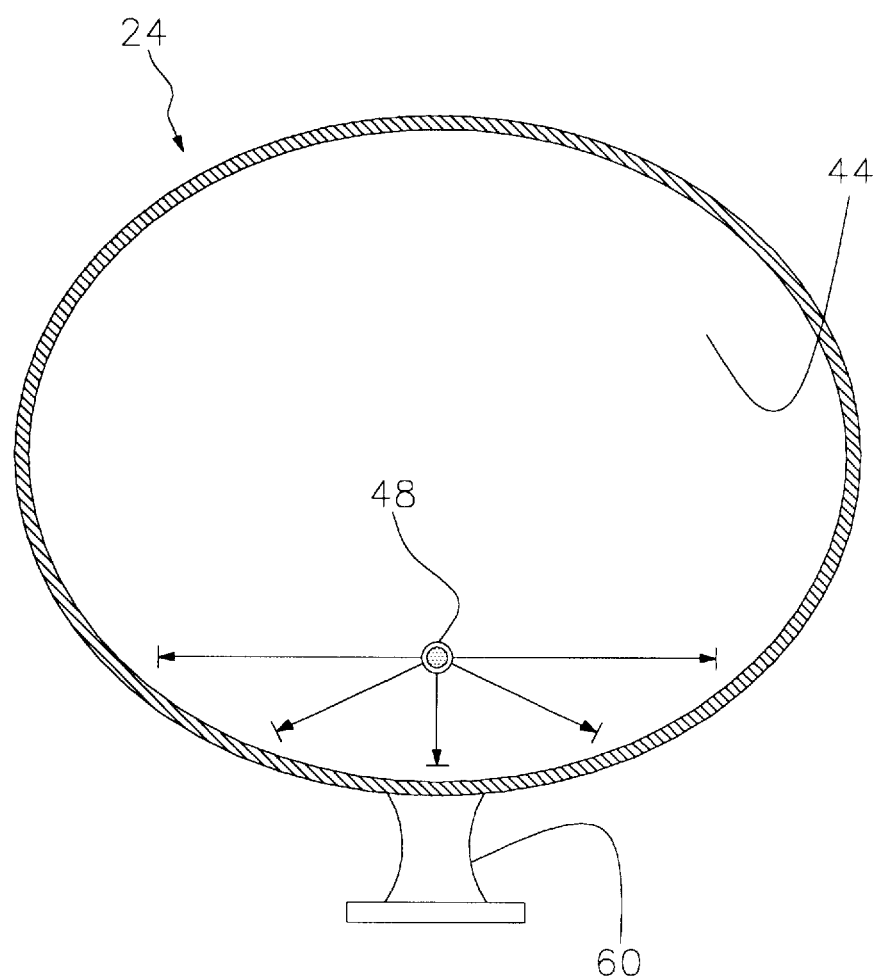
FIG. 3 is a cross-section taken along line A—A of the vessel depicted in FIG. 2.

Referring now to FIG. 3, a cross-section taken along line A—A of the vessel depicted in FIG. 2 is illustrated. It should be noted that like numbers appearing in the various figures correspond to like components. The vessel 24 has the discharge means 44 arrayed therein and the apertures on the tubing 48 are oriented for a 90 degree projection, a 45 degree projection and a 0 degree projection. As shown in FIG. 3, a tri-phase discharge is disclosed e.g. 90 degree, 45 degree, and 0 degree.

As stated earlier, the aperture drilled at a 45 degree angle would slurry the sand/solids around the drain. The aperture drilled at a 90 degree angle would loosen any packed sand/solids along the walls of the vessel. The 0 degree phase would funnel those solids above the drain. Further, in the preferred embodiment, the discharge of the fluid within the vessel 24 may be done periodically as in an intermittent mode. Of course, it is possible to have a discharge means designed with only a single phase aperture, double phase apertures, and/or tri-phase apertures. As shown, the tubing 48 is approximately 12 inches above the bottom of the vessel 24.

Figure 4:
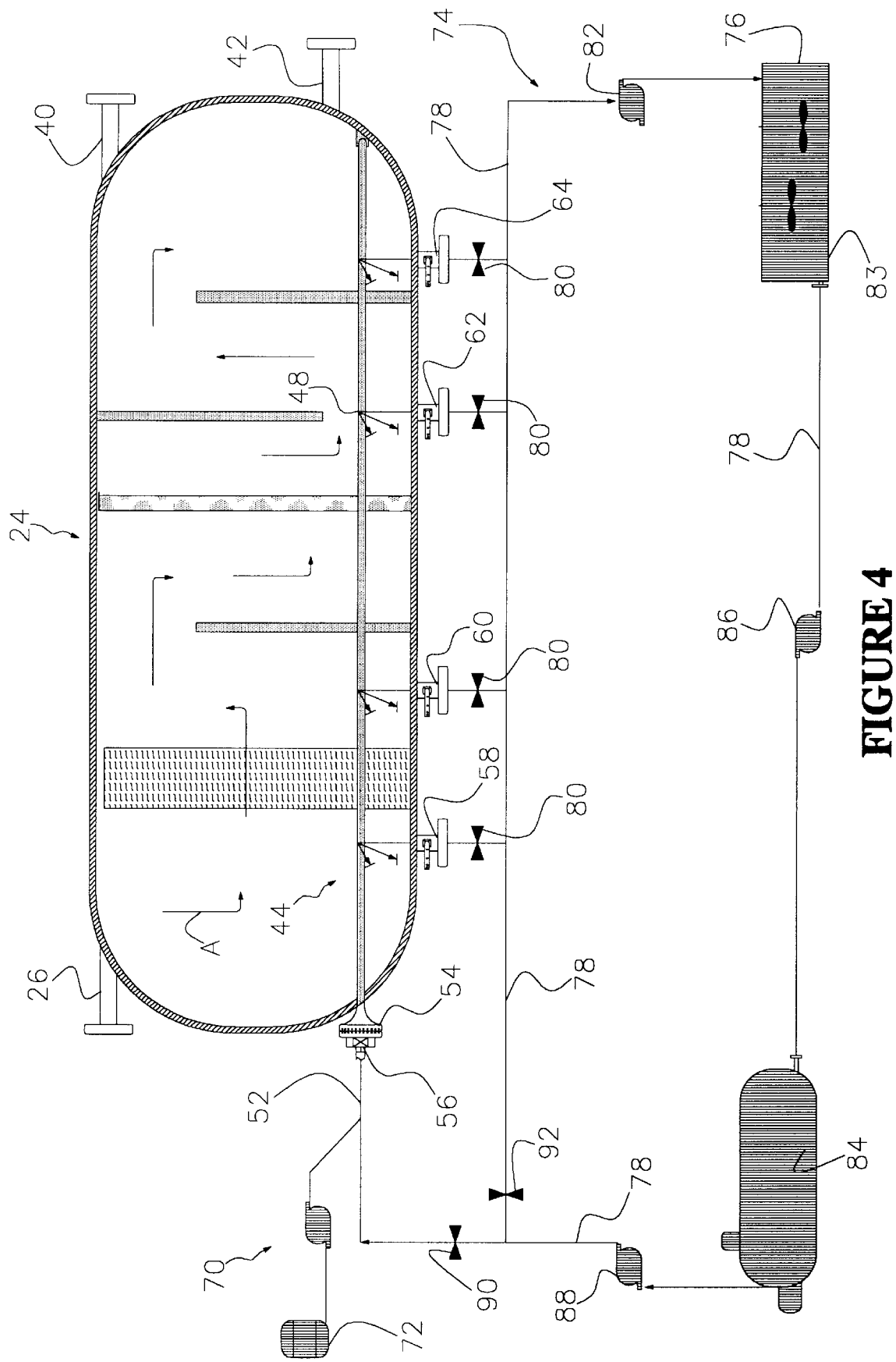
FIG. 4 is a cross-sectional view of a second embodiment of the present invention.

With reference to FIG. 4, a cross-sectional view of a second embodiment of the present invention is shown. The vessel 24 has installed therein the previously described discharge means 44. This embodiment further includes a chemical injection means 70 for injecting a dissolution chemical for solubilizing naturally occurring radioactive materials that are found in the solid formation particles. The dissolution chemical is contained within the storage tank 72. Thus, the dissolution chemical may be added to the normal process for discharging the fluid utilized to clean the vessel 24. The rate of dissolution chemical injection is dependent on the type of chemical used, the magnitude of the radioactive element's occurrence, and the amount of solids (solids including but not limited to sand, rust and particularly scale). The operator will be able to vary the injection rate as needed.

Also included within this embodiment will be the treating means 74 for treating the solids for radioactive material. The treating means 74 includes a slurry tank 76 that is fluidly connected to the line 78. It should be noted that the drains 58, 60, 62, 64 are each adapted to separate valve means 80 for opening or closing said drains, with the valve means 80 being in turn connected to the line 78. The line 78 will contain therein a pump means 82 for pumping the drained solids into the previously mentioned mixing tank 76.

The mixing tank 76 will contain a mixing device in order to thoroughly mix the solids with the dissolution chemical. The solids may be segregated within the mixing tank 76 via the weir 83 (note: it is possible to place a screen at 83). The mixing tank 76 will be fluidly connected to a heating unit 84 via the line 78 with the line 78 containing therein another pump means 86 for pumping the contents of the mixing tank to the heating unit 84. The heating unit will heat the solids and liquid to better treat the solid with the dissolution chemical.

The liquid will exit the heating unit 84 via the line 78, with this section of the line containing pump means 88 for pumping the liquid slurry through the line. A by-pass mechanism is provided which includes a first valve means 90 and a second valve means 92. With the first valve means 90 closed and the second valve means 92 opened, the line 78 forms a closed-loop system. Thus, the operator may by-pass the vessel 24 so that the slurry may be re-circulated within the loop 78 so that the solids containing the radioactive material may be thoroughly treated.

Thus, the method of the present invention may include producing the effluent from the well. The effluent will be received within the vessel 24 which in turn separates the effluent into a liquid phase and a gas phase. During this process, the solids suspended with the slurry will segregate at the bottom of the vessel. The discharged means 44 will inject a fluid into the vessel 24 so that the segregated solids are fluidized.

Thereafter, the drains 58, 60, 62, 64 may be opened and the solids can be drained. Then, the operator may terminate the injection of the cleaning fluid. During the time the solids were being purged from the vessel 24, the well continued to produce the effluent from the well.

The method may also include utilizing the chemical injection means 70, operatively associated with said discharge means 44, for injecting a radioactive dissolution treating chemical onto the produced solids as seen in FIG. 4. The method further comprises injecting the radioactive dissolution treating chemical via the chemical injection pump 70 into the pipe 52 and ultimately onto the solids within the vessel 24. Then, the operator would drain the segregated solids through the drain means 58, 60, 62, 64 by opening the valve means 80.

The solids would then be pumped via pump means 82 to a slurry tank 76. In the slurry tank, the solids and dissolution chemical are mixed. The solids may also be segregated. The slurry will then be transported to the heating unit 84 via the pump means 86. The heat aids in the dissolution chemical thoroughly reacting with the radioactive material contained on the solids so that the radioactive material may be extracted from the solids and thereafter suspended in the fluid phase. Next, the slurry is pumped via pump means 88 into the line 78. It should be noted that the operation is now in the by-pass mode in order to soak the solids thoroughly with the dissolution chemical and the drains valves 80 will be closed. Since the by-pass valve 90 is closed and the by-pass valve 92 is opened, the slurring can be continuously circulated within this loop 78. After appropriate circulation, the valve 92 is closed. Of course, the operator can continuously circulate within the vessel in order to dissociate any NORM associated with solids accumulated therein, including but not limited to scale deposited within the vessel.

The mixing tank can be cleared of the solids which have collected in the mixing tank 76 and the liquid can be disposed. One method of disposal is transportation to a disposal injection well.

Changes and modifications in the specifically described embodiments can be carried out without departing from the scope of the invention which is intended to be limited only by the scope of the appended claims.

We claim:

1. An apparatus for separating an effluent from a well, the effluent consisting of fluids, gas and solids, the apparatus comprising:

a vessel connected to the well, said vessel containing an inlet for the effluent;

separating means, contained within said vessel, for separating said effluent into a liquid phase and gas phase, and wherein the solids settle to the bottom of the vessel;

fluid outlet means, operatively associated with said vessel, for releasing said separated fluid phase from said vessel;

gas outlet means, operatively associated with said vessel, for releasing said separated gas phase from said vessel;

discharge means, attached to said vessel, for discharging a liquid onto the solids at the bottom of the vessel;

drain means, attached to said vessel, for draining said solids from the bottom of the vessel.

2. The apparatus of claim 1 further comprising:

pump means for pumping the liquid through said discharge means so that the liquid urges the solids into said drain means.

3. The apparatus of claim 2 wherein said discharge means comprises:

a line having a first end and a second end, with the first end being attached to the vessel and with the second end being attached to said pump means, with said line having an opening thereon so that the liquid is discharged onto the solids.

4. The apparatus of claim 3 further comprising chemical injection means, operatively associated with said line, for injecting a radioactive dissolution chemical.

5. The apparatus of claim 4 wherein said line contains an opening oriented as follows: in a 90 degree inclination to the bottom of said vessel, a 45 degree inclination to the bottom of said vessel, and a 0 degree inclination to the bottom of said vessel.

6. The apparatus of claim 5 further comprising a treating means for treating the solids for radioactive materials including:

a slurry tank adapted to the drain for mixing and separating the entrained solids and liquid;

a second pump means for pumping the chemically treated liquid to a heating unit used for heating the chemically treated liquid, wherein the heating unit is fluidly connected to the vessel's line and a by-pass line, and wherein the by-pass line is adapted for circulating the chemically treated liquid within a closed-loop.

7. An improved cleaning apparatus for a separator, said separator including an inlet for the introduction of an effluent, the effluent containing a liquid phase, a gas phase and entrained solids within said effluent, the separator further including: means for separating said effluent into the liquid phase and gas phase; a fluid outlet means for channeling the fluid out of the vessel; a gas outlet means for channeling the gas out of the vessel; drain means, operatively associated with the bottom of said vessel, for draining the separator, and wherein the improvement comprises:

spraying means, adapted within said separator, for spraying a liquid at the solids at the bottom of the separator; and, intermittent pump means, operatively associated with said spraying means, for delivering the spraying liquid into said spraying means.

8. The improved cleaning apparatus of claim 7 further comprising:

chemical injection means, operatively associated with said spraying means, for injecting a radioactive dissolution chemical within said separator so that the solids are treated with said radioactive dissolution chemical.

9. The improved cleaning apparatus of claim 8 wherein said spraying means includes:

a line having a first end and a second end, and wherein said line traverses the inside of the separator, with the first end of the line being attached to the inside of the separator, and the second end of the line extending from the separator, with said line being attached to said intermittent pump means; and wherein said line contains a plurality of openings so that the spraying liquid is allowed a passage onto the solids.

10. The improved cleaning apparatus of claim 9 wherein said plurality of openings contained on said line includes: an opening oriented in a 90 degree plane relative to the bottom of said separator; an opening oriented in a 45 degree plane relative to the bottom of said separator; and an opening oriented in a 0 degree plane relative to the bottom of said separator.

11. The improved cleaning apparatus of claim 10 wherein said 90 degree opening, 45 degree opening and 0 degree opening are aligned above said drain contained within said separator.

12. A method of cleaning a vessel, the vessel containing an inlet for the introduction of an effluent which was produced from a well, the effluent containing a fluid phase, a gas phase and entrained solids within said effluent, the vessel further including: means for separating said effluent into the fluid phase and gas phase; a fluid outlet means for channeling the fluid out of the vessel; a gas outlet means for channeling the gas out of the vessel; drain means, operatively associated with the bottom of said vessel, for draining the vessel; discharge means, adapted within said vessel, for discharging a liquid into the solids at the bottom of the vessel; and, intermittent pump means, operatively associated with said discharge means, for delivering the liquid into said discharge means, openings are oriented in a first orientation and a second orientation, a mixing tank, and a heating unit, the method comprising:

producing the effluent from the well;

receiving the effluent within the vessel;

separating the effluent into a liquid phase and a gas phase;

segregating the solids at the bottom of the vessel;

injecting a fluid into said vessel so that the solids are fluidized;

cleaning said vessel by draining said fluidized solids through said drain means.

13. The method of claim 12 further comprising:

terminating the injection of the fluid;

continuing to produce the effluent from the well.

14. The method of claim 12 wherein said vessel further contains chemical injection means, operatively associated with said fluid injection means, for injecting a radioactive dissolution treating chemical onto the solids, and wherein the vessel has associated therewith a mixing tank and a heating unit fluidly connected with said mixing tank; and, wherein the method further comprises:

injecting the radioactive treating dissolution chemical onto the solids;

draining said fluidized solids through said drain means;

pumping the entrained solids to the mixing tank;

mixing the solids and liquid within the mixing tank;

transporting the liquid to the heating unit;

heating the liquid in the heating unit.

15. The method of claim 14 further comprising the steps of:

shutting off the drain valves so that no drainage from the vessel is possible;

pumping said heated solids and liquid back into the slurry tank;

mixing the solids and liquid within the mixing tank;

transporting the liquid to the heating unit;

heating the liquid in the heating unit.

* * * * *